(12) United States Patent
Schaefer et al.

(10) Patent No.: US 11,444,289 B2
(45) Date of Patent: Sep. 13, 2022

(54) CONTACT ELEMENT, PLUG WITH A CONTACT ELEMENT AND CONTACT ARRANGEMENT FOR CONTACTING A BIPOLAR STACK

(71) Applicant: TE Connectivity Germany GmbH, Bensheim (DE)

(72) Inventors: Maik Schaefer, Gernsheim (DE); Zoran Stjepanovic, Darmstadt (DE); Helge Schmidt, Speyer (DE)

(73) Assignee: TE Connectivity Germany GmbH, Bensheim (DE)

( * ) Notice: Subject to any disclaimer, the term of this patent is extended or adjusted under 35 U.S.C. 154(b) by 327 days.

(21) Appl. No.: 16/539,407

(22) Filed: Aug. 13, 2019

(65) Prior Publication Data

US 2020/0058946 A1 Feb. 20, 2020

(30) Foreign Application Priority Data

Aug. 14, 2018 (DE) .......................... 102018213688.2

(51) Int. Cl.
*H01M 8/0202* (2016.01)
*H01M 8/2404* (2016.01)
(Continued)

(52) U.S. Cl.
CPC ....... *H01M 8/0202* (2013.01); *H01M 8/0297* (2013.01); *H01M 8/2404* (2016.02);
(Continued)

(58) Field of Classification Search
CPC ............. H01M 8/0202; H01M 8/2404; H01M 8/0297; H01M 8/2465; H01R 13/17; H01R 13/22; H01R 13/6271; H01R 33/76
See application file for complete search history.

(56) References Cited

U.S. PATENT DOCUMENTS 10,497,921 B2 12/2019 Kotter et al.
2002/0022382 A1 2/2002 Franklin et al.
(Continued)

FOREIGN PATENT DOCUMENTS

DE 10 2013 208 249 A1 11/2013
DE 10 2013 206 129 A1 10/2014
(Continued)

OTHER PUBLICATIONS

Voigt et al. DE 10 2014 225 949 A1. Jun. 16, 2016. English machine translation by EPO. (Year: 2016).*
(Continued)

*Primary Examiner* — James Lee
(74) *Attorney, Agent, or Firm* — Barley Snyder

(57) ABSTRACT

A contact element for contacting a bipolar plate of a fuel cell stack includes a contact body extending along a longitudinal axis. The contact body has a channel extending along the longitudinal axis and delimited by a pair of channel walls disposed opposite one another in a direction transverse to the longitudinal axis. The channel is adapted to receive a portion of the bipolar plate. The contact body has a contact spring on a first channel wall of the pair of channel walls. The contact spring protrudes into the channel and has a cutting edge directed toward a second channel wall of the pair of channels walls and adapted to contact the bipolar plate.

20 Claims, 3 Drawing Sheets

(51) Int. Cl.
*H01M 8/0297* (2016.01)
*H01M 8/2465* (2016.01)
*H01R 13/17* (2006.01)
*H01R 13/22* (2006.01)
*H01R 33/76* (2006.01)
*H01R 13/627* (2006.01)

(52) U.S. Cl.
CPC .......... *H01M 8/2465* (2013.01); *H01R 13/17* (2013.01); *H01R 13/22* (2013.01); *H01R 13/6271* (2013.01); *H01R 33/76* (2013.01)

(56) References Cited

U.S. PATENT DOCUMENTS

| | | |
|---|---|---|
| 2004/0023090 A1 | 2/2004 | Pearson et al. |
| 2008/0003482 A1 | 1/2008 | Komiyama et al. |
| 2013/0209911 A1 | 8/2013 | Otake et al. |
| 2019/0312286 A1 | 10/2019 | Haase et al. |

FOREIGN PATENT DOCUMENTS

| | | |
|---|---|---|
| DE | 10 2014 225 949 A1 | 6/2016 |
| DE | 102016225438 A1 | 6/2018 |
| EP | 3143654 A1 | 3/2017 |
| KR | 10-2012-0050132 A | 5/2012 |

OTHER PUBLICATIONS

Translation and abstract of KR 20100058995, dated Jun. 4, 2010, 16 pages.
Extended European Search Report, European Patent Application No. 19190505.8, dated Jan. 7, 2020, 6 pages.
Abstract of KR 10-2012-0050132 A, dated May 18, 2012, 1 page.

* cited by examiner

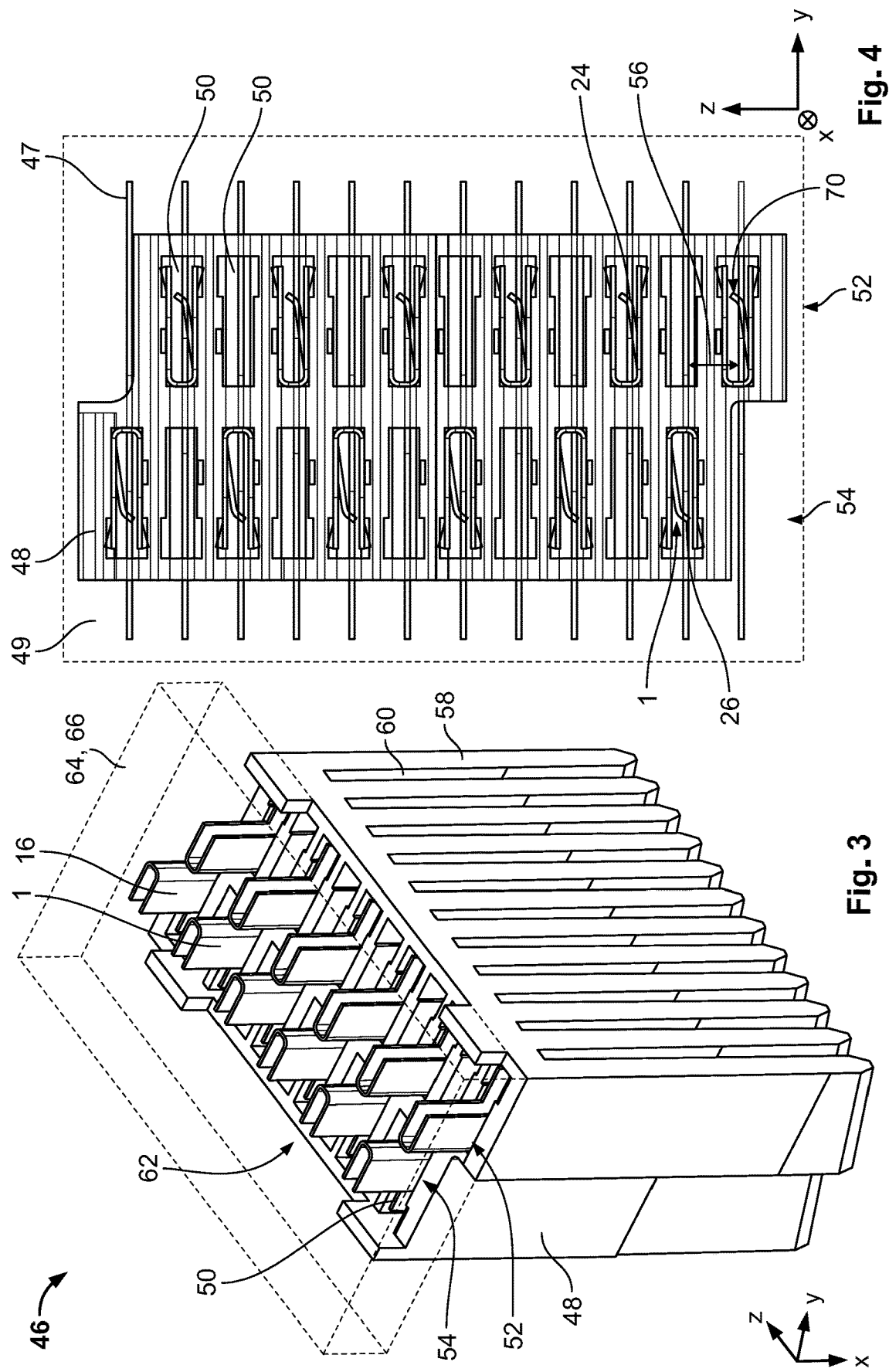

CONTACT ELEMENT, PLUG WITH A CONTACT ELEMENT AND CONTACT ARRANGEMENT FOR CONTACTING A BIPOLAR STACK

CROSS-REFERENCE TO RELATED APPLICATIONS

This application claims the benefit of the filing date under 35 U.S.C. § 119(a)-(d) of German Patent Application No. 102018213688.2, filed on Aug. 14, 2018.

FIELD OF THE INVENTION

The present invention relates to a contact element and, more particularly, to a contact element for contacting a bipolar plate.

BACKGROUND

In a fuel cell stack, individual cells are layered above one another to form the stack, with each of them being separated by a bipolar plate. The bipolar plates are used to conduct operational media to electrodes of the fuel cells. In order to investigate the performance and/or failure of the fuel cell stack, for example in a vehicle, the bipolar plates between the cells are connected via a plug with a control circuit and the voltage in each cell is measured. A contact element is used to contact a bipolar plate of a fuel cell stack. The plug includes a plurality of the contact elements contacting a plurality of bipolar plates of the fuel cell stack.

In particular in vehicles, the plugs are exposed to heavy vibration loads and/or impact loads, as a result of which the contact elements can become detached from the bipolar plates. Vibrations and/or impacts can additionally generate fluctuating voltage values between the bipolar plate and the contact element, leading to an inaccurate assessment of the fuel cell stack.

SUMMARY

A contact element for contacting a bipolar plate of a fuel cell stack includes a contact body extending along a longitudinal axis. The contact body has a channel extending along the longitudinal axis and delimited by a pair of channel walls disposed opposite one another in a direction transverse to the longitudinal axis. The channel is adapted to receive a portion of the bipolar plate. The contact body has a contact spring on a first channel wall of the pair of channel walls. The contact spring protrudes into the channel and has a cutting edge directed toward a second channel wall of the pair of channels walls and adapted to contact the bipolar plate.

BRIEF DESCRIPTION OF THE DRAWINGS

The invention will now be described by way of example with reference to the accompanying Figures, of which:

FIG. 3 is a perspective view of a plug according to an embodiment;
FIG. 4 is a plan view of the plug.

DETAILED DESCRIPTION OF THE EMBODIMENT(S)

Hereinafter, the invention is described in greater detail by way of example using exemplary embodiments with reference to the attached figures. In the figures, elements which correspond to one another in structure and/or function are provided with the same reference symbols.

The combination of features shown and described in the individual exemplary embodiments serves solely for the purposes of explanation. It is possible to dispense with a feature of an exemplary embodiment if its technical effect is of no importance in a particular application. Conversely, a further feature can be added in an exemplary embodiment if its technical effect is meant to be advantageous or necessary for a particular application.

Figure 1:
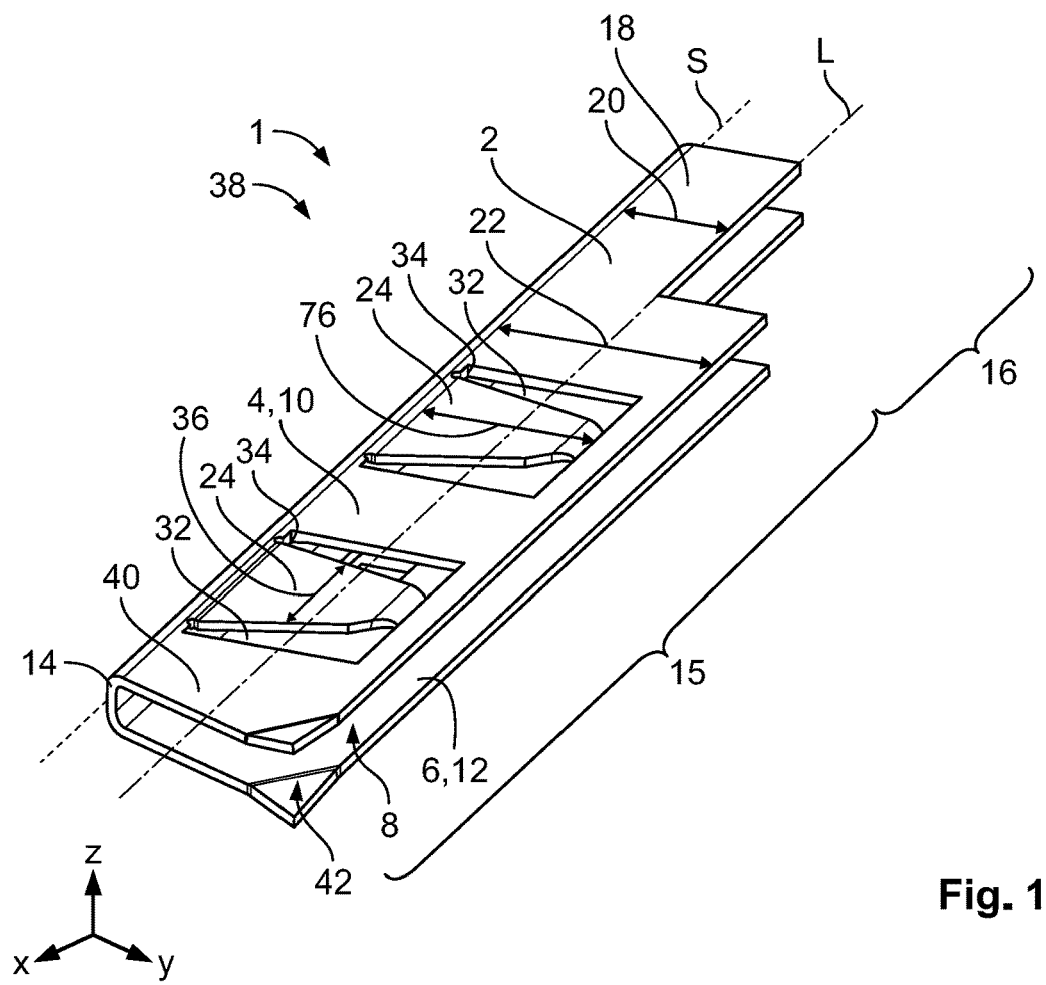
FIG. 1 is a perspective view of a contact element according to an embodiment.
Figure 2:
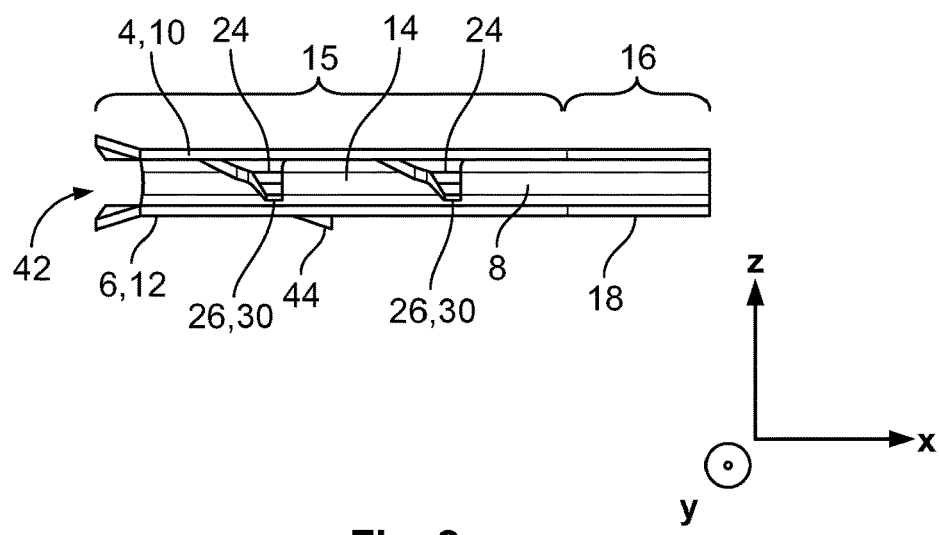
FIG. 2 is a side view of the contact element.

A contact element 1 according to an embodiment is shown in FIGS. 1 and 2. A Cartesian coordinate system is used in the description, with a longitudinal direction x, a transverse direction y, and a depth direction z.

The contact element 1, as shown in FIGS. 1 and 2, has a contact body 2 extending along a longitudinal axis L. The longitudinal axis L is substantially parallel to the longitudinal direction x. The contact body 2 has a substantially U-shaped cross-section in a plane spanned by the transverse direction y and depth direction z. A pair of limbs 4, 6 of the contact body 2 are spaced apart from one another in the depth direction z transverse to the longitudinal axis L. The limbs 4, 6 are arranged substantially parallel to a plane spanned by the longitudinal direction x and transverse direction y. The limbs 4, 6 delimit a channel 8 in the depth direction z, and the limbs 4, 6 function as channel walls 10, 12. The channel 8 is delimited on one side in the transverse direction y by a base 14 connecting the channel walls 10, 12. The channel 8 is open at the end opposite from the base 14. The channel 8 forms a receiving region 15, in which a portion of a bipolar plate can be received. In this case, the contact body 2 can encompass the portion of the bipolar plate, wherein the channel walls 10, 12 cover the portion.

The contact body 2, as shown in FIGS. 1 and 2, has a plug-in portion 16, which extends in the longitudinal direction x and is arranged at an end 18. A width 20 of the channel walls 10, 12 of the plug-in portion 16 in the transverse direction y, in the shown embodiment, is smaller than a width 22 of the channel walls 10, 12 in the receiving region 15, and can be introduced into a plug-in aperture of an electrical conductor, such as a printed circuit board for example. In an embodiment, the plug-in portion 16 is coated with a tin coating, so that the plug-in portion can be attached for example with a solder joint in the plug-in aperture of the electrical conductor.

For contacting a portion of a bipolar plate inserted into the channel 8, the contact element 1 has, on a channel wall 10, two contact springs 24 shown in FIGS. 1 and 2 which protrude into the channel 8 and which are each provided with a cutting edge 26 directed towards the opposite channel wall 12. The contact springs 24 are spaced apart from one another in the longitudinal direction x and extend away from the base 14 in the transverse direction y. The contact springs 24 are elastically deflectable about a pivot axis S on the base 14, which pivot axis S is arranged substantially parallel to the longitudinal axis L. The contact springs 24 are connected to the channel wall 10 and are pre-tensioned in the direction of the opposite channel wall 12, such that the contact springs 24 can be deflected in the direction of the channel wall 10 upon insertion of the portion of the bipolar plate. The contact spring 24 is spaced from the opposite channel wall 12 by a spacing smaller than a material thickness of the bipolar plate.

The cutting edge 26 is formed at a free end 30 of the contact spring 24 remote from the base 14, as shown in FIG. 2. The free end 30 is bent in the direction of the opposite channel wall 12, so that the cutting edge 26 extends parallel to the longitudinal axis L and is arranged at an angle between approximately 60° and approximately 120° to a plane spanned by the longitudinal direction x and the transverse direction y. The surface of the inserted portion of the bipolar plate is arranged parallel to the plane spanned by the longitudinal direction x and transverse direction y. Thus, it can be ensured that the cutting edge 26 has good contact with the surface of the bipolar plate.

The cutting edge 26 can be arranged closer to the opposite channel wall 12 than to the channel wall 10, away from which the contact spring 24 extends. Because the bipolar plate used with the contact element 1 shown in FIGS. 1 and 2 is contacted on one side, a spring path around which the contact spring 24 can deflect elastically must be taken into account only on the channel wall 10, which is provided with the contact springs 24. Thus, a particularly compact contact element 1 can be manufactured.

As shown in FIG. 1, the channel wall 10 has plurality of windows 32 which each allow access to a contact spring 24. Each contact spring 24 is arranged in one window 32 and extends away from a frame 34 facing the base 14 in the transverse direction y of the base 14. In an embodiment, the cutting edge 26 can be arranged closer to the open end of the channel 8 than to the base 14. As a result, incorrect stacking of stacked bipolar plates in the depth direction z can be compensated, because a broad clearance arises between cutting edge 26 and base 14, into which the portion of the bipolar plate can be inserted. The depth to which the portion of a bipolar plate is inserted into the channel 8 in the transverse direction y can vary, with the result that, during plugging-in, a plug can be plugged with an accurate fit into a receptacle of a bipolar plate stack of a fuel cell stack, even in the case of incorrect stacking.

By way of the window 32, the elastic deflection of the contact spring 24 can be prevented from influencing, and likewise deflecting, the channel wall 10. During the deflection, the contact spring 24 does not press against the channel wall 10 and thus does not push the channel wall 10 away from the opposite channel wall 12. Thus, the spacing between the channel walls 10, 12 does not change even when the bipolar plate is inserted.

As shown in FIGS. 1 and 2, the contact spring 24 tapers further from the base 14, such that a length 36 in the longitudinal direction x decreases with an increasing spacing from the base 14 up to the cutting edge 26. The cutting edge 26 can, in an embodiment, extend in the longitudinal direction x with a length of approximately 0.4 mm, for example. As a result, a contact force acting through the spring force of the contact spring 24 can be concentrated on a small contact area. In an embodiment, the cutting edge 26 has a higher strength than the bipolar plate, and the cutting edge 26 can have a greater hardness than the bipolar plate.

In an embodiment, the contact element 1 can be molded from a stainless steel, such as a chromium-nickel alloy or a titanium alloy. The contact element 1 can be a monolithic component 38, which can be manufactured simply and inexpensively in a single production process, for example by stamping and bending. The material thickness of the metal sheet can be approximately 0.1 mm thick, for example, wherein the normal force per spring 24, which acts upon the surface of the portion of the bipolar plate, can be between approximately 1.8 N and 3.5 N, such that the plugging force of a contact element 1 adds up to approximately 5 N.

The contact element 1, as shown in FIGS. 1 and 2, has an insertion chamfer 42 at its end 40 opposite the plug-in portion 16, so that when the contact element 1 is plugged onto a portion of the bipolar plate, the insertion of the portion into the channel 8 is facilitated, and the contact element 1 is prevented from being damaged during insertion of the bipolar plate into the channel 8, for example by the sharp edges of the bipolar plate that car arise from laser cutting or stamping of the bipolar plate.

The depth of the channel 8 in the depth direction z increases in the region of the insertion chamfer 42, as shown in FIGS. 1 and 2. The insertion chamfer 42 can be formed, for example, at the corners of the channel walls 10, 12 which are remote from the base 14, wherein the corners are bent in the direction away from one another. As a result, the insertion chamfer 42 acts both during insertion of the bipolar plate in the longitudinal direction x and also in the transverse direction y. The channel 8 is opened at both ends in the longitudinal direction x, so that the depth in the longitudinal direction x to which the portion of the bipolar plate can be inserted is not limited, and can vary, thus it is possible to compensate an incorrect positioning of the bipolar plates in the longitudinal direction x.

As shown in FIGS. 1 and 2, the contact element 1 is provided, on the channel wall 8 opposite the contact spring 24, with a latching tab 44 deflected in the direction away from the channel 8. With the latching tab 44, the contact element 1 can latch in a contact chamber of a housing of a plug and the contact element 1 can thus be fitted securely into the contact chamber.

A plug 46 according to an embodiment is shown in FIG. 3. The plug 46 is shown plugged on a stack of bipolar plates 47 of a fuel cell stack 49 in FIGS. 4 and 5.

The plug 46, as shown in FIGS. 3 and 4, has a housing 48, which is traversed by a plurality of contact chambers 50 in the longitudinal direction x. The housing 48 is electrically insulating and can be manufactured by an injection molding method, for example. The contact chambers 50 are spaced apart from one another in the depth direction z, wherein a first group of contact chambers 50 is arranged in a first row 52 and a second group of contact chambers 50 in a second row 54. The first and second rows 52, 54 are spaced apart from one another in the transverse direction y and are arranged offset in relation to one another in the depth direction z by a spacing 56, shown in FIG. 4, between the contact chambers 50 in a row 52, 54. The spacing 56 corresponds to the spacing between the bipolar plates 47 arranged behind one another.

As shown in FIG. 3, the first row 52 of contact chambers 50 adjoins a first side wall 58, which is traversed by slots 60, in order to make it possible to insert a portion of a bipolar plate 47 into the contact chamber 50. Similarly, the second row 54 of contact chambers 50 adjoins a second side wall 62 opposite the first side wall 58. The second side wall 62 is likewise traversed by slots 60. The slots 60 are each arranged on a plane perpendicular to the depth direction z with an adjoining contact chamber 50.

As shown in FIGS. 3 and 4, contact elements 1 are fitted in an alternating manner, so that every second contact chamber 50 in a row 52, 54 is provided with a contact element 1. Since the rows 52, 54 are offset in relation to one another, the contact elements 1 are not arranged in a common plane spanned by the longitudinal direction x and the transverse direction y. The contact elements 1 are arranged in the rows 52, 54 in such a way that the channel 8 opens in the transverse direction y relative to the adjoining side wall 58, 62.

Figure 5:
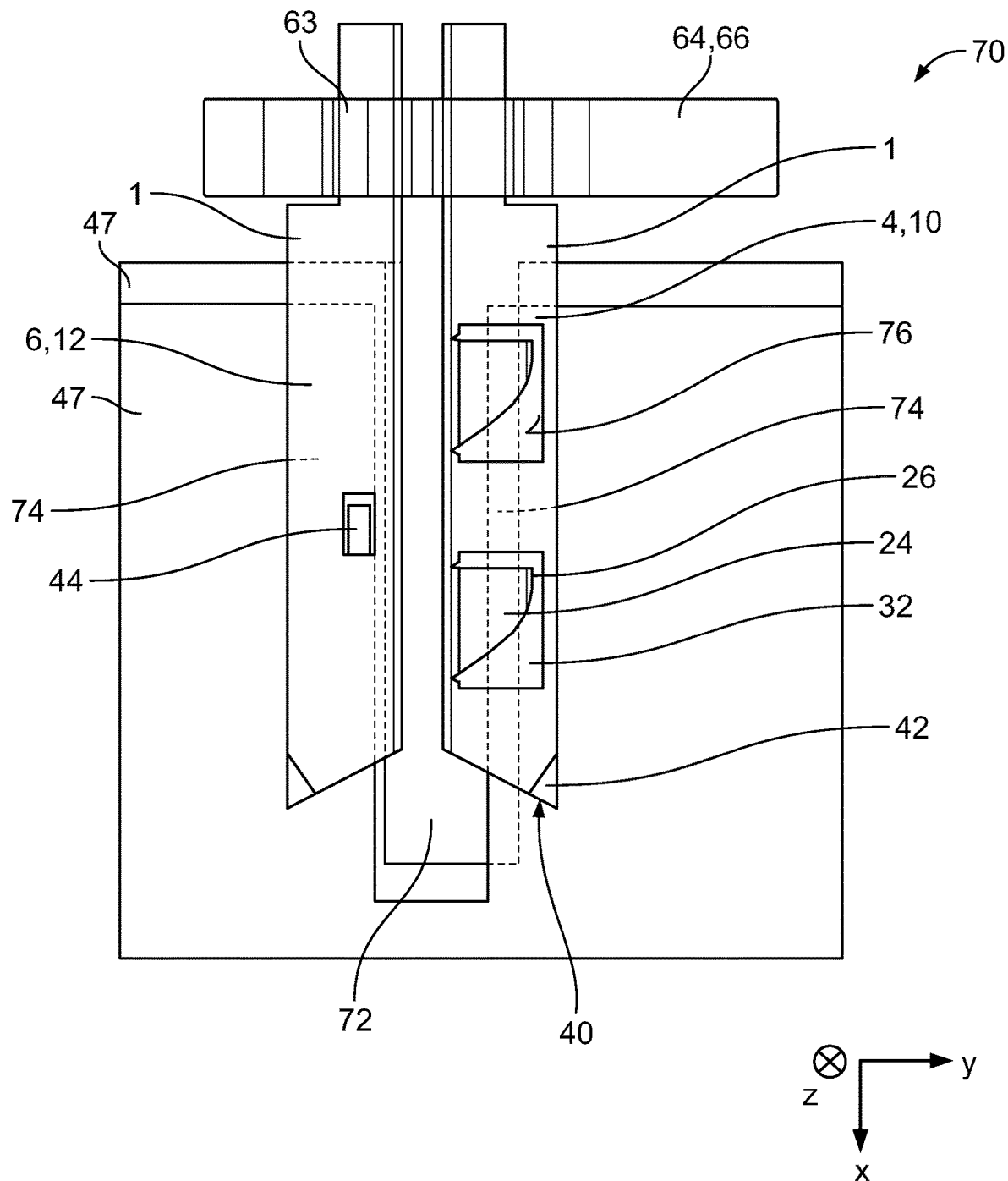
FIG. 5 is a front view of a contact arrangement according to an embodiment.

As shown in FIGS. 3 and 5, the plug-in portions 16 protrude out of the contact chamber 50 in the longitudinal direction x and are inserted, and firmly soldered, into insertion apertures 63 of an electrical conductor 64, for example a flexible printed circuit board 66.

A contact arrangement 70 comprising a contact element 1 and a bipolar plate 47 is shown in FIG. 5. The bipolar plate 47 has a substantially rectangular cutout 72, wherein the cutout 72 should ideally be flush with stacked bipolar plates 47, so that a plug 46 can be inserted with an accurate fit into the cutout 72. However, incorrect positionings can occur frequently, in which the bipolar plates 47 can be arranged offset in relation to one another in the transverse direction y and/or the longitudinal direction x. By way of this offset, the plug 46 can no longer be inserted with an accurate fit into the cutout 72, without deforming the bipolar plates 47.

The bipolar plate 47 has edge portions 74, shown in FIG. 5, which flank the cutout 72 and can be inserted into the channel 8 in the transverse direction y and the longitudinal direction x. The depth to which the edge portion 74 can be inserted into the channel 8 in the transverse direction y can vary by a length 76 in the transverse direction y by which the cutting edge 26 is spaced apart from the base 14. The edge portion 74 can be inserted at most until it comes to a stop on the base 14 in the transverse direction y. In the longitudinal direction x, the edge portion 74 can even be inserted until it comes to a stop at the closed end of the slot 60 of the housing 48.

When the edge portion 74 is inserted into the channel 8, the contact springs 24 are deflected elastically by the edge portion 74 about a pivot axis S shown in FIG. 1 aligned substantially parallel to the longitudinal axis L, in the direction of the channel wall 10 on which the contact springs 24 are arranged. The cutting edge 26 cuts into a surface 76, facing the channel wall 10 provided with the contact springs 24, of the edge portion 74 of the bipolar plate 47. The surface 76 is coated, wherein the cutting edge 26 traverses the coating and presses against the surface 76 with great force between approximately 1.8 N and approximately 3.5 N. Since the cutting edge 26 cuts into the surface 76, secure contacting in the contact arrangement 70 can be created, which withstands heavy loads, for example impact loads and/or vibration loads. Thus, the fluctuation in the measurement results during the journey can be reduced.

In FIG. 5, two contact arrangements 70 are shown, wherein the contact arrangements 70 are stacked behind one another and the bipolar plates 47 are arranged offset in relation to one another by an offset in the longitudinal direction x and the transverse direction y. The contact elements 1 are fitted in a plug 46 and can be plugged into the cutout 72, so that an edge portion 74 of the front bipolar plate 47 in the channel 8 of the front contact element 1 and the opposite edge portion 74 of the rear bipolar plate 47 in the depth direction z are arranged in the channel 8 of the rear contact element. The high tolerance of the contact element 1 in the longitudinal direction x and the transverse direction y makes it possible for the plug 46 to be pluggable with an accurate fit into the cutout 72, without bending the bipolar plates 47 out of shape and/or damaging them.

What is claimed is:

1. A contact element for contacting a bipolar plate of a fuel cell stack, comprising:
    a contact body extending along a longitudinal axis, the contact body has a channel extending along the longitudinal axis and delimited by a pair of channel walls disposed opposite one another in a direction transverse to the longitudinal axis, the channel is adapted to receive a portion of the bipolar plate, the contact body has a contact spring on a first channel wall of the pair of channel walls, the contact spring extending transversely to the longitudinal axis and into the channel, and having a cutting edge directed toward a second channel wall of the pair of channels walls and adapted to contact the bipolar plate, the contact spring is elastically deflectable about a pivot axis extending in a direction of the longitudinal axis.

2. The contact element of claim 1, wherein the cutting edge extends parallel to the longitudinal axis.

3. The contact element of claim 1, wherein the contact spring comprises a pair of contact springs disposed on the first channel wall.

4. The contact element of claim 1, wherein the cutting edge is disposed on a free end of the contact spring.

5. The contact element of claim 4, wherein the free end of the contact spring is bent in a direction of the second channel wall.

6. The contact element of claim 1, wherein the contact body and the contact spring are formed in a single piece as a monolithic component.

7. The contact element of claim 1, wherein the contact spring extends away from a base that connects the first channel wall and the second channel wall.

8. The contact element of claim 7, wherein the base delimits the channel in the direction transverse to the longitudinal axis.

9. The contact element of claim 8, wherein the contact spring defines a width in the direction of the longitudinal axis, the width of the contact spring tapering in a direction extending away from the base.

10. The contact element of claim 1, wherein the contact body has an insertion chamfer at an end along the longitudinal axis.

11. The contact element of claim 1, wherein the pivot axis of the contact spring is defined on a base that connects the first channel wall and the second channel wall.

12. The contact element of claim 1, wherein the first channel wall defines a window formed therethrough, the contact spring arranged within the window.

13. The contact element of claim 1, wherein a height of the first channel wall relative to the base is greater than a height of the contact spring.

14. The contact element of claim 1, wherein the first channel wall extends from the base in a first direction, and the contact spring extends from the base in a second direction oblique to the first direction.

15. A plug for contacting a plurality of bipolar plates of a fuel cell stack, comprising:
    a housing having a plurality of contact chambers aligned in parallel, arranged next to one another, and open along a longitudinal axis; and
    a contact element arranged in at least one of the contact chambers, the contact element including a contact body extending along the longitudinal axis, the contact body has a channel extending along the longitudinal axis and delimited by a pair of channel walls disposed opposite one another in a direction transverse to the longitudinal axis, the channel is adapted to receive a portion of the bipolar plate, the contact body has a contact spring on a first channel wall of the pair of channel walls, the contact spring protruding into the channel and having a cutting edge directed toward a second channel wall of the pair of channels walls and adapted to contact the bipolar plate, the contact element further including a plug-in portion protruding out of the at least one contact chamber in which it is arranged and connected to an electrical conductor, the first channel wall defining a window formed therethrough, the contact spring arranged within the window.

16. The plug of claim 15, wherein the plurality of contact chambers are arranged in a pair of rows offset in relation to one another.

17. The plug of claim 15, wherein the plug-in portion protrudes out of the contact chamber in a direction of the longitudinal axis.

18. The plug of claim 15, wherein the contact spring extends transversely to the longitudinal axis.

19. The plug of claim 15, wherein the contact spring is elastically deflectable about a pivot axis extending in the longitudinal a direction of the longitudinal axis.

20. A contact arrangement, comprising:

a bipolar plate of a fuel cell stack; and a contact element having a contact body extending along a longitudinal axis, the contact body has a channel extending along the longitudinal axis and delimited by a pair of channel walls disposed opposite one another in a direction transverse to the longitudinal axis, the channel is adapted to receive a portion of the bipolar plate, the contact body has a pair of contact springs on a first channel wall of the pair of channel walls, each contact spring protruding into the channel and having a cutting edge directed toward a second channel wall of the pair of channels walls and adapted to cut into a surface of the bipolar plate, each contact spring is elastically deflectable about a pivot axis extending in a direction of the longitudinal axis.

* * * * *